United States Patent
Pan et al.

(10) Patent No.: US 12,105,966 B1
(45) Date of Patent: Oct. 1, 2024

(54) SYSTEM AND METHOD FOR MANAGING POWER CONSUMPTION IN DEPLOYMENTS

(71) Applicant: Dell Products L.P., Round Rock, TX (US)

(72) Inventors: Xingcai Pan, Shanghai (CN); James Guyer, Northborough, MA (US); Paul D. Lorusso, Boxborough, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/319,932

(22) Filed: May 18, 2023

(51) Int. Cl.
*G06F 3/06* (2006.01)

(52) U.S. Cl.
CPC .......... *G06F 3/0625* (2013.01); *G06F 3/0631* (2013.01); *G06F 3/0653* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 8,166,315 B1* | 4/2012 | Wambach | G06F 1/26 713/300 |
| 9,009,500 B1* | 4/2015 | Fan | G06F 1/26 713/300 |
| 2017/0160784 A1* | 6/2017 | Fuxa | G06F 3/0625 |

OTHER PUBLICATIONS

Patterson et al. "A Case for Redundant Arrays of Inexpensive Disks (RAID)." Jun. 1988. ACM. SIGMOD '88. pp. 109-116.*

* cited by examiner

*Primary Examiner* — Nathan Sadler
(74) *Attorney, Agent, or Firm* — Womble Bond Dickinson (US) LLP

(57) ABSTRACT

Methods and systems for managing systems based on power consumption are disclosed. To operate data processing systems, power may be supplied to the systems. Power supply capacity may be provisioned based on the estimated power consumption for the systems. To estimate the power consumption of the systems, limits on the operation of components of the systems may be taken into account. These limits may reduce the power consumption by the components from nominal power consumption ascribed by a manufacturer. The limits may be caused by the communication architecture or other features of the systems.

20 Claims, 7 Drawing Sheets

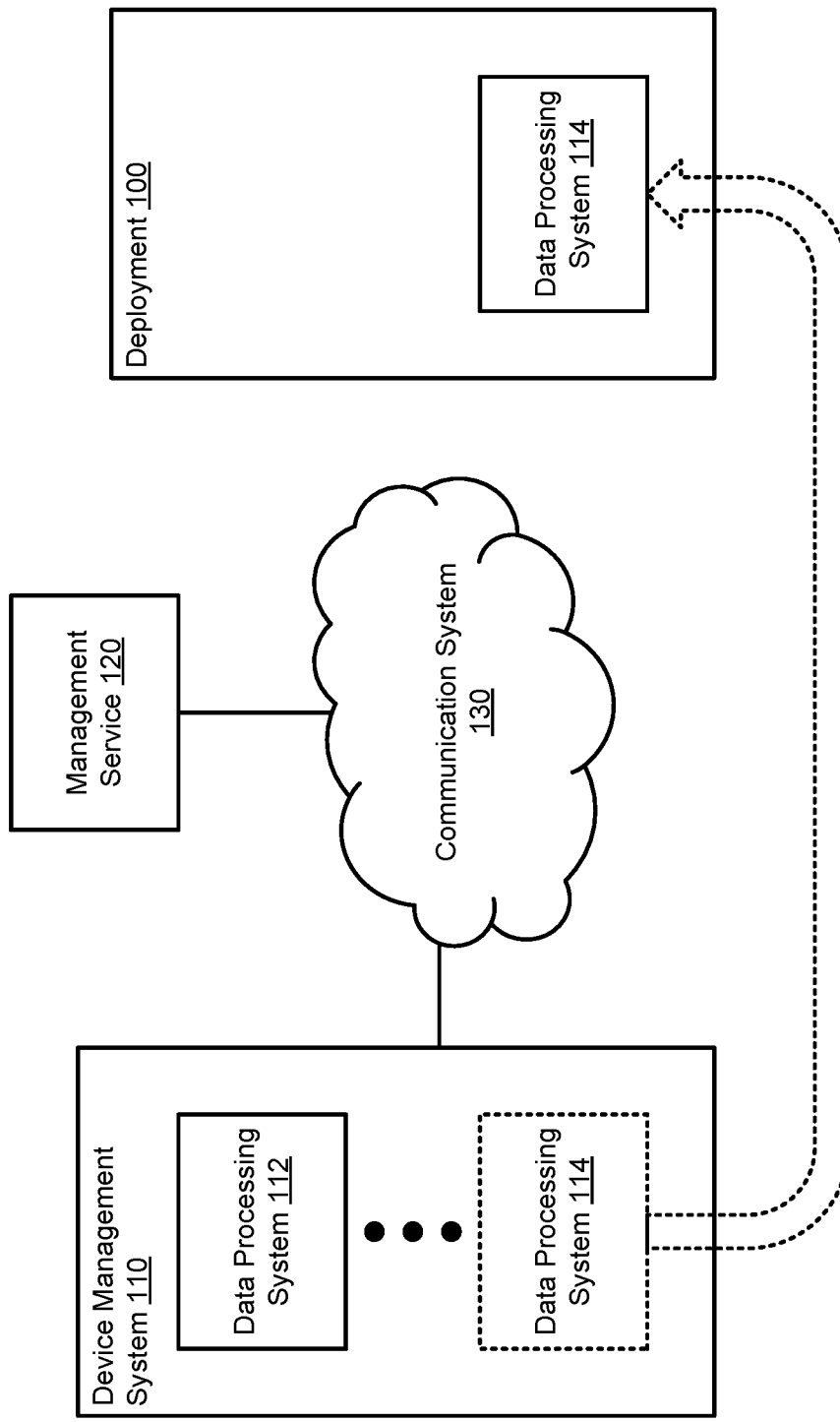

SYSTEM AND METHOD FOR MANAGING POWER CONSUMPTION IN DEPLOYMENTS

FIELD

Embodiments disclosed herein relate generally to power management. More particularly, embodiments disclosed herein relate to systems and methods to manage systems based on estimated power consumption.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

DETAILED DESCRIPTION

Figure 2A:
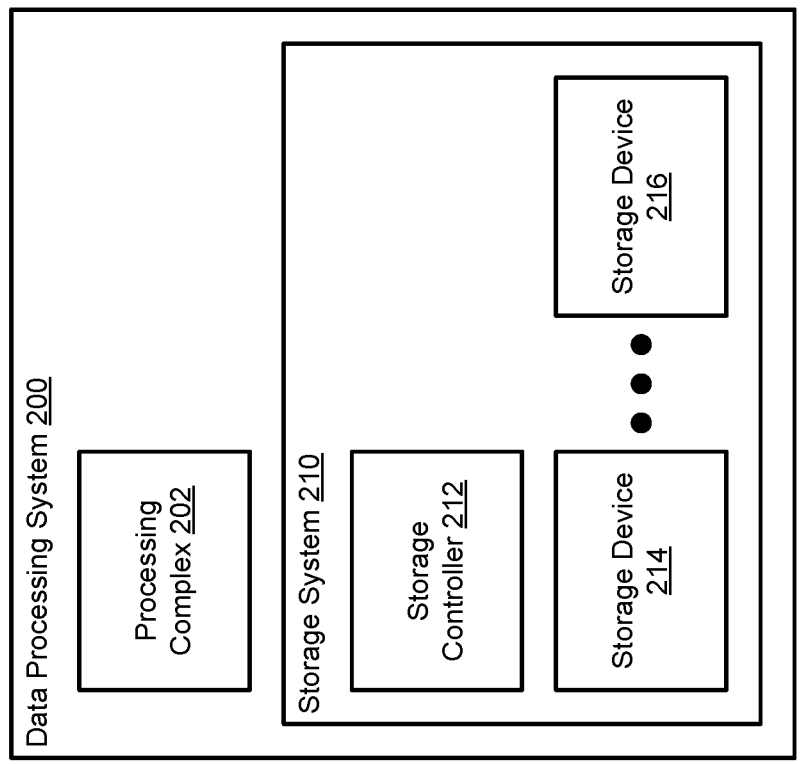
FIG. 2A shows a block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using data processing systems. To provide the computer implemented services, data processing systems may be added to a deployment to either establish the deployment or supplement resources of the deployment.

To decide on whether to add a data processing system to the deployment, characteristics of the data processing system may be taken into account. These characteristics may include likely power consumption by the data processing system once added to the deployment.

To improve the accuracy of power consumption estimates for data processing systems, limits on the operation of hardware components of the data processing systems that may cause them to diverge from manufacturer ascribed power consumption rates. These limits may include, for example, rates at which data may be supplied to storage devices. If the rate at which data is supplied to a storage device is limited to less than the maximum rate at which the storage device may store the data, then the storage device may be likely to maximally consume less power than that ascribed by the manufacturer.

The reduced rate of power consumption may be estimated based on empirical data, formulas, or other methods. The resulting maximum power consumption estimates for a storage device may be used to estimate the power consumption by a storage system, and a host data processing system. Consequently, the resulting power consumption estimates may be more likely to be accurate when limits on the operation of hardware components of data processing systems are present.

By more accurately estimating power consumption, power provisioning in deployments may be more likely to match the actual power consumption of data processing systems added to the deployment. Consequently, deployments may be less likely to be over provisioned with power supply capacity. Thus, embodiments disclosed herein may address, among others, the technical problem of power consumption estimation for data processing systems that may be subject to operation limits unrelated to power systems. The disclosed embodiments may do so by taking into account communication bandwidth limits that reduce the rates at which hardware components may operate from their maximum operating rates.

In an embodiment, a method for managing power consumption by a deployment is provided. The method may include obtaining a hardware configuration for a data processing system model under consideration for addition to the deployment; performing a saturation analysis for a storage system of the data processing system model based on the hardware configuration to identify an operation limit for the storage system; performing a power consumption analysis for the storage system based on the operation limit to obtain a power consumption estimate for the storage system; and using the power consumption estimate to determine whether to add an instance of the data processing system model to the deployment.

The method may also include, in a first instance of the power consumption estimate where the instance of the data processing system is determined to be added to the deployment: deploying the instance of the data processing system model to the deployment.

Using the power consumption estimate may include populating a graphical user interface based on the power consumption estimate; obtaining, via the graphical user interface, user input based on the populated graphical user interface, the user input indicating acceptance or rejection of the data processing system model for addition to the deployment.

Using the power consumption estimate may also include identifying, using the graphical user interface, a second hardware configuration for the data processing system model.

The operation limit may be a limit on a rate of use of storage devices of the storage system, the limit on the rate of use of the storage devices reducing a maximum power draw for the storage devices from a nominal maximum power draw for the storage devices.

The limit on the rate of use of the storage devices of the storage system may be based on a bandwidth limit of a storage controller of the storage system.

The power consumption estimate may include a sub-estimate for a maximum amount of power drawn by the storage system when the storage devices are saturated and a sub-estimate for a maximum amount of power drawn by a storage device of the storage system when the storage devices are saturated.

Performing the saturation analysis and performing the power consumption analysis may include identifying a number of storage devices of the storage system; and in an instance of the number of storage devices exceeding a threshold, using a formula that defines a power consumption rate for a storage device of the storage system that scales inversely to the number of the storage devices of the storage system.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include deployment 100. Deployment 100 may be a new or existing piece of infrastructure operated by an entity (e.g., a business). Deployment 100 may include any number of data processing systems.

Each of the data processing systems may have a limited capacity for providing computer implemented services. Additionally, over time the quantity and/or type of computer implemented services desired by the entity may change. Consequently, the capacity of deployment 100 to provide computer implemented services may become insufficient.

Similarly, if a new deployment is being established, a number of data processing systems may need to be added to the deployment so that it may provide computer implemented services.

To change the capacity of deployment 100, additional data processing systems may be added to deployment 100. For example, the entity managing deployment 100 may contract with a seller of data processing systems to have data processing systems (e.g., 114) added to deployment 100.

To add a data processing system to deployment 100, capabilities and requirements for operation of the data processing system may need to be identified. For example, during operation, data processing systems may consume electrical power and generate heat. Thus, estimates for the amount of power consumed may need to be obtained such that appropriate utility power is available.

However, if the estimates for power are inaccurate, the amount of electrical power may be over provisioned for actual needs of the data processing system. Likewise, an operator of deployment 100 may elect not to include a data processing system if its estimated power consumption is inaccurate and exceeds power consumption estimates for other data processing systems.

In general, embodiments disclosed herein may provide methods, systems, and/or devices for adding data processing systems to deployments by more accurately estimating the amount of power that a data processing system is likely to consume. To accurately estimate the amount of power that a data processing system is likely to consume, the system shown in FIG. 1 may take into account various limits on the operation of data processing systems that may reduce the maximum amount of power drawn by components of the data processing system from nominal power consumption limits.

For example, data processing systems components such as hard disk drives may have a manufacturer ascribed maximum power consumption identified through rigorous testing. However, the maximum power consumption ascribed by the manufacturer may presume that the hard disk drive will at least from time to time operate at its maximum operational rate (e.g., maximum rate of reading or storing data). If the hard disk drive is limited from operating at its maximum operational rate, then the maximum power consumption ascribed by the manufacturer may not reflect the real work maximum power consumption of the hard disk drive.

To accurately estimate the maximum power consumption rate by components of a data processing system, the system of FIG. 1 may take into limits on the maximum operational rate of components of the system. For example, the system of FIG. 1 may identify and take into account communication bandwidth limits between components of a data processing system which may reduce (e.g., from nominal) the maximum rate at which storage devices operate. Consequently, the power consumption estimates obtained by the system of FIG. 1 may take into account limits unconsidered by the manufacturer by a data processing system. Accordingly, the estimates may be more accurate when data processing systems are deployed to deployment 100.

To provide the above noted functionality, the system of FIG. 1 may include deployment 100, device management system 110, and management service 120. Each of these components is discussed below.

Deployment 100, as noted above, may provide computer implemented services using any number of data processing systems. To do so, deployment 100 may (i) onboard data processing systems, (ii) use the onboarded data processing systems to provide the computer implemented services, and (iii) provide power to the data processing systems while the data processing systems provide the computer implemented services. The data processing systems may be onboarded, for example, by adding the data processing systems to a computing environment, and connecting them to utility power or other sources of power.

An example of an onboarding process is illustrated in FIG. 1 using the oversized arrow drawn with dashed outlining to indicate that data processing system 114 which was previously with device management system 110 had been moved to deployment 100. In the example, an operator of deployment 100 may have decided to add additional computing resources. To do so, the operator may use a portal or other system presented by the operator of device management system 110 to review, select, and enter into agreements to obtain data processing systems from an operator of device management system 110.

Device management system 110 may (i) facilitate acquisition of new data processing systems (112-114) for use in deployment 100 (and/or other deployments), and (ii) cooperatively provide power estimates for various data processing systems (e.g., 112-114) with management service 120.

To facilitate acquisition of new data processing systems, device management system 110 may implement a portal or other interface through which agents of various entities may enter contractual relationships for adding data processing systems to various deployments. When used by the agents, information regarding power consumption for various data processing systems may be estimated and provided to the agents for decision making purposes via a graphical user interface. Refer to FIG. 2D for additional details regarding graphical user interfaces through which power consumption estimates may be reviewed.

To provide the power consumption estimates, device management system 110 may provide information to management service 120 regarding models of data processing systems under consideration by agents. Management service 120 may use the information to estimate the power likely to be consumed by individual devices of a data processing system, sub-systems, and the system itself, discussed in greater detail below.

Device management system 110 may also include physical structures such as, for example, warehouses, logistical centers, and/or other facilities for storing, provisioning, and shipping data processing systems to various deployments.

Management service 120 may (i) obtain information regarding configurations of data processing systems, (ii) identify limits on the operation of components of the data processing systems based on the configurations, (iii) estimate power consumption based on the operation limits of the components, and (iv) use the estimates to inform decision makers (e.g., agents) of the likely behavior of data processing systems under consideration for addition to various deployments. Refer to FIG. 2A for additional details regarding configurations of data processing systems, and FIGS. 2B-2C for additional details regarding use of the configurations in power consumption estimation.

Figure 3:
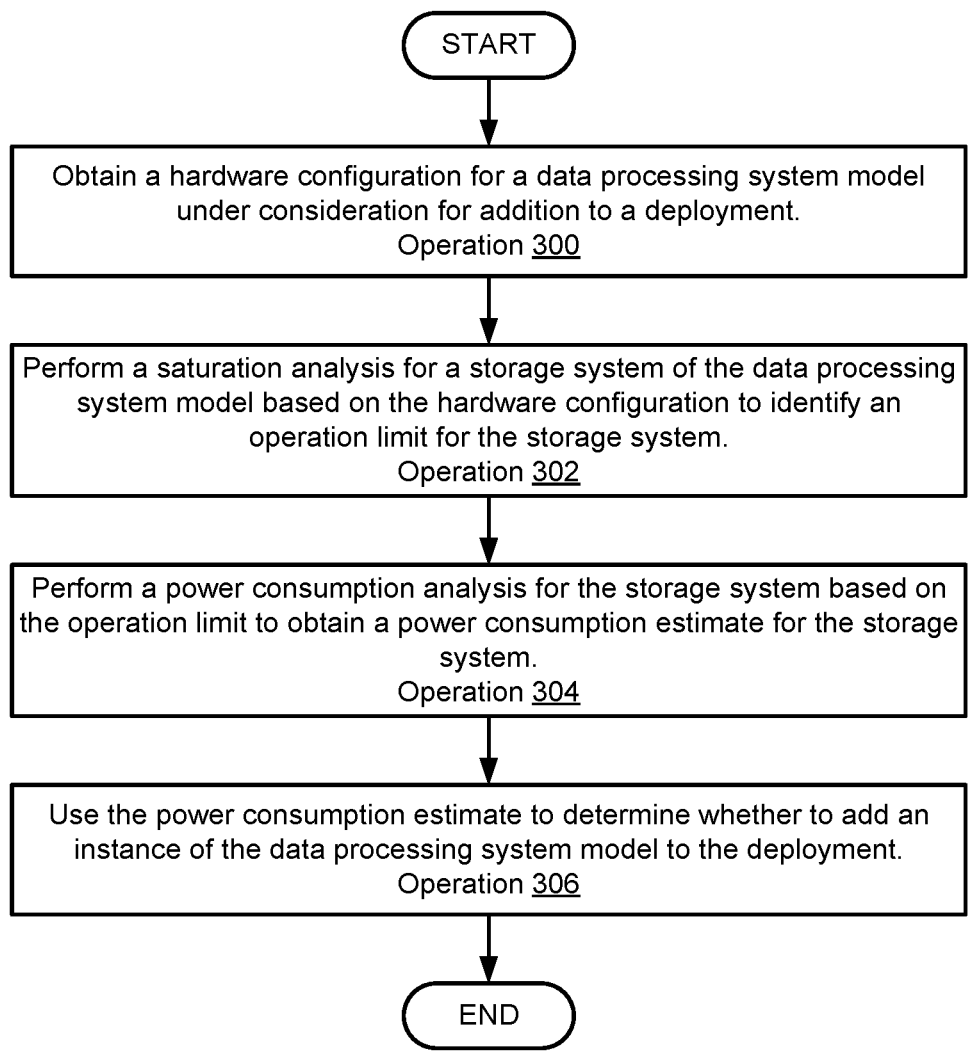
FIG. 3 shows a flow diagram illustrating a method in accordance with an embodiment.

When providing their functionality, any of (and/or components thereof) deployment 100, device management system 110, and/or management service 120 perform all, or a portion, of the method illustrated in FIG. 3.

Any of (and/or components thereof) deployment 100, device management system 110, data processing systems 112-114, and/or management service 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, the configuration of a data processing system may impact the maximum amount of power that it is likely to draw during its operation. The system of FIG. 1 may take into account the configuration of a data processing system when assessing power consumption.

Turning to FIG. 2A, a diagram of data processing system 200 in accordance with an embodiment is shown. Data processing system 200 may be similar to any of data processing systems 112-114 shown in FIG. 1.

To provide computer implemented services, data processing system 200 may include processing complex 202 and storage system 210. Processing complex may include hardware components such as processors and memory modules usable to execute computer instructions. When doing so, data may be generated for storage, and previously stored data may be used. To store and retrieve data, processing complex 202 may communicate with storage system 210.

Storage system 210 may include hardware components such as storage controller 212 and storage devices 214-216. Storage controller may process incoming write and read operations from processing complex 202, and assign them to storage devices for performance.

Storage devices 214-216 may store data and provide copies of previously stored data. To do so, processing complex 202, storage controller 212, and storage devices may need to communicate with one another.

However, if bottle necks in communication between these devices are present, limits on the operation of storage devices 214-216 may be imposed. For example, if storage device 214 is able to store data at a rate of 100 megabytes (MB) s, but storage controller 212 is saturated and only able to supply data for storage at a rate of 80 MBs, then storage device 214 may be limited from its maximum nominal rate of operation. Accordingly, the maximum rate at which storage device 214 may consume power may also be reduced.

To take into account these limitations, the system of FIG. 1 may use the configuration of data processing system 200 to estimate power consumption. When doing so, the system of FIG. 1 may take into account (i) numbers and types of components, (ii) connectivity between the components, and/or other factors that may create limits on the operation of the components.

Figure 2B:
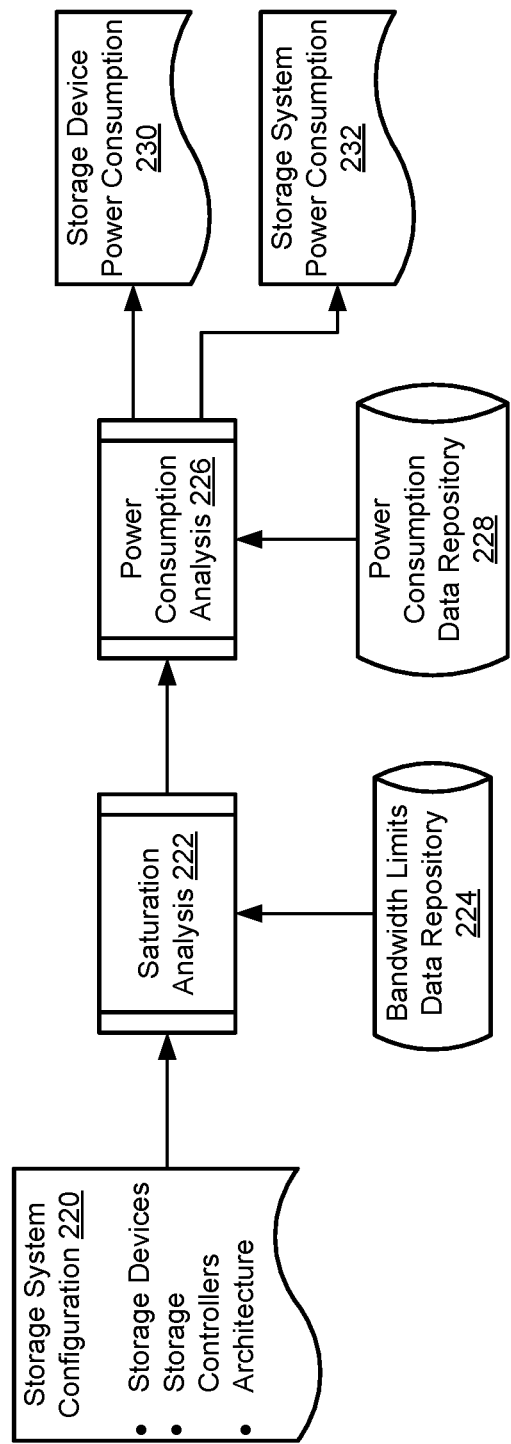
FIGS. 2B-2C show data flow diagrams in accordance with an embodiment.

Turning to FIG. 2B, a first data flow diagram in accordance with an embodiment is shown. The data flow shown in FIG. 2B may be used to estimate power consumption by storage devices and storage systems. The data flow may be performed, for example, when a user utilizes a graphical user interface as shown in FIG. 2D to analyze a potential configuration for a data processing system to be added to a deployment. The data flow may be performed for other purposes.

In FIG. 2B, a first set of shapes (e.g., 220, 230, 232) is used to indicate data structure, a second set of shapes (e.g., 222, 226) is used to indicate processes that may be performed, and a third set of shapes (e.g., 224, 228) is used to indicate repositories which may include information usable to perform the processes. Any of the data structures may be implemented using, for example, unstructured data, tables, linked lists, data bases, lists, and/or any other type of structure for organizing information. Any of the processes may be performed by software components (e.g., executing programs) and/or hardware components (e.g., processors that may host the programs and/or special purposes hardware devices that may perform all or a portion of the functionality of the programs). The repositories may be implemented using, for example, databases or other types of entities for organizing information.

To estimate the power likely to be consumed by various portions of a data processing system, storage system configuration 220 may be obtained. Storage system configuration 220 may include information regarding a storage system of a model of a data processing system under consideration for addition to a deployment. The information regarding the storage system may include (i) information regarding numbers and types of hardware components such as storage controllers, storage devices, power supplies, cooling components, and/or other types of hardware components, and (ii) information regarding a communication architecture that operably connects some of the hardware components such as types of communication links connecting the components, bandwidth of the communication links, latency of the communication links, and/or other types of information reflecting limits on the ability of the hardware components to communicate with one another.

The information regarding the types of hardware components may include, for example, types, manufacturers, model numbers, and/or other types of information usable to identify the hardware components. The information regarding the communication architecture may allow bottlenecks or other issues that may impact power consumption due to a limitation on the operation of a storage device being imposed by the communication architecture. Refer to FIG. 2D for additional details regarding how storage system configuration 220 may be obtained.

Once obtained, storage system configuration 220 may be used during performance of saturation analysis 222. During saturation analysis, the communication architecture may be analyzed to identify any limits that will be placed on the operation of storage devices. For example, the communication architecture may be analyzed by (i) identifying communication links that supply data to storage device, storage controllers, etc., (ii) identifying the bandwidth of these links, (iii) identifying any limits on the links due to hardware components such as storage controllers which may limit the rate at which data may be supplied to storage devices served by the storage controllers, and (iv) using the identified limits, bandwidth, and communication links to identify any hardware components that may be saturated and any downstream links to storage devices that may be impacted by the saturation.

For example, consider a scenario where storage controller supplies data to four storage devices that may store data at a rate of 100 MBs, but the storage controller may only process data at a rate of 300 MBs. In this example scenario, saturation analysis 222 may identify that the storage controller may limit the bandwidth of communication links to the storage devices to 75 MBs (e.g., 300/4). Consequently, the storage devices may be limited in their operation from a maximum rate of storing data that would be nominally ascribed by a manufacturer.

To identify such limits, information from bandwidth limits data repository 224 may be used. Bandwidth limits data repository 224 may include information regarding the saturation rates for various storage controllers and/or other types of storage devices. The information may be obtained by, for example, performing a lookup using an identity of a storage controller as a key. The lookup may return, from bandwidth limits data repository 224, limits on the upstream bandwidth and/or downstream bandwidth of the storage controller.

The identified limits along with storage system configuration 220 may be subsequently used in power consumption analysis 226 to identify the likely amount of power that will actually be consumed by individual storage devices (e.g., storage device power consumption 230) and storage systems (e.g., storage system power consumption 232). During power consumption analysis 226, the bandwidth limits imposed on storage devices may be used to identify the maximum amount of power that will likely be consumed by each storage device for the configuration defined by storage system configuration 220. To identify the power consumption rate, the bandwidth limits and/or identity of a given storage device may be used to obtain the power consumption limit from power consumption data repository 228.

Power consumption data repository 228 may include information regarding the maximum power consumption rate for each type of storage device for a given bandwidth limit. The content of power consumption data repository 228 may be obtained through laboratory experimentation (e.g., measuring power consumption for given rates of storing data in the storage device), via a subject matter expert, and/or via other methods.

Once power consumption estimates for each device of a storage system is obtained, an aggregate power consumption rate for the storage system may be obtained by summing the power consumption rates of the individual components. The storage device power consumption 230 and storage system power consumption 232 resulting from power consumption analysis 226 may be used by decision makers to decide whether a data processing system having the configuration defined by storage system configuration 220 should be added to a deployment. Refer to FIG. 2D for additional details regarding the decision making process.

In addition to the power consumption of individual devices and storage systems, decision makers may be provided with other information regarding power consumption of a data processing system under consideration for addition to a deployment.

Figure 2C:
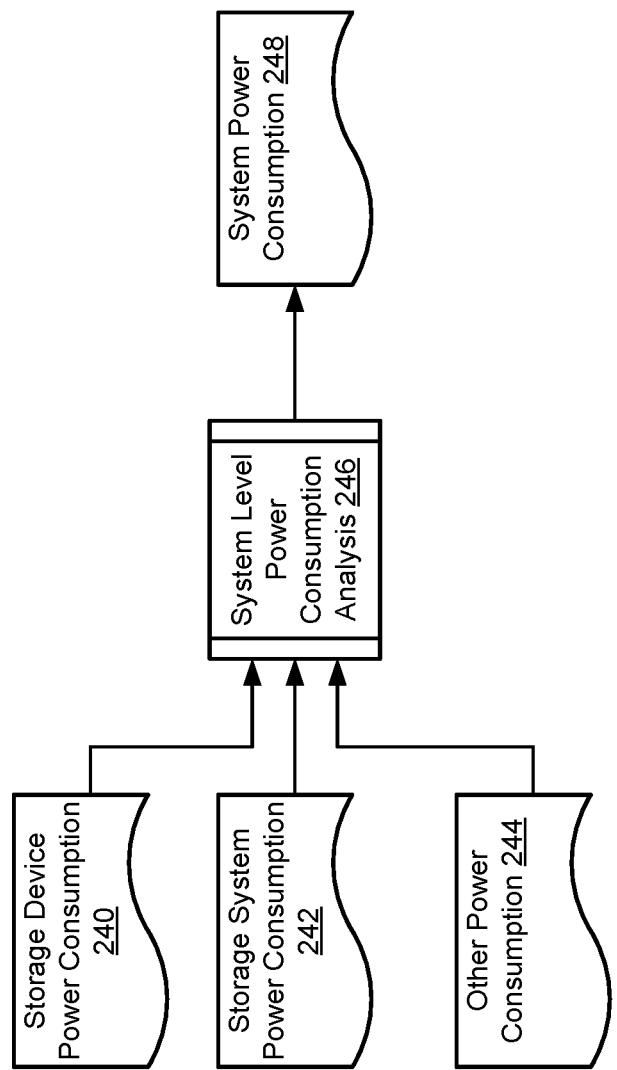
Figure 2D:
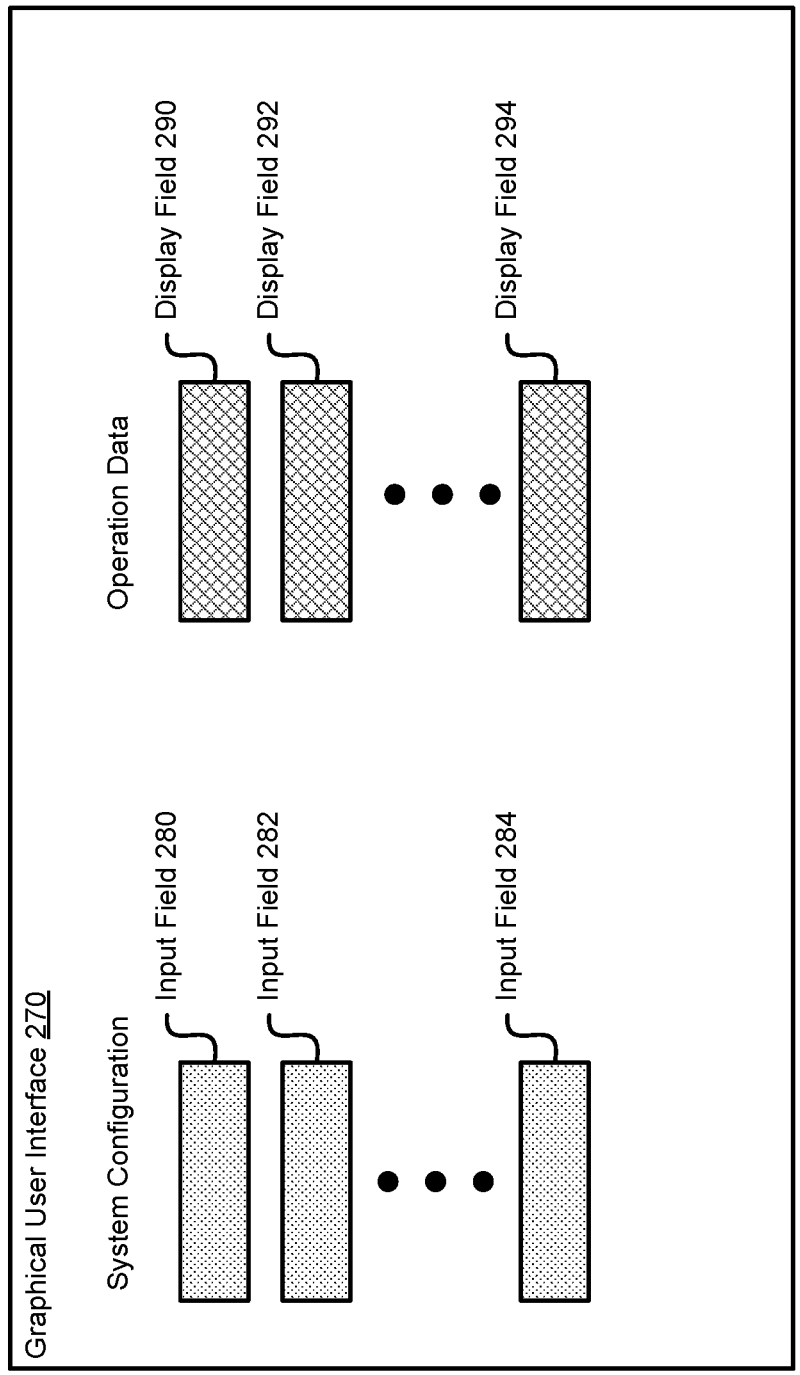
FIG. 2D shows a diagram of a graphical user interface in accordance with an embodiment.

Turning to FIG. 2C, a second data flow diagram in accordance with an embodiment is shown. The data flow shown in FIG. 2C may be used to estimate power consumption by a system. The data flow may be performed, for example, when a decision maker is attempting to calculate a power budget for a deployment. The data flow may be performed for other purposes.

In FIG. 2C, a first set of shapes (e.g., 240, 242, 244, 248) is used to indicate data structure, and a second set of shapes (e.g., 246) is used to indicate processes that may be performed. Any of the data structures may be implemented using, for example, unstructured data, tables, linked lists, data bases, lists, and/or any other type of structure for organizing information. Any of the processes may be performed by software components (e.g., executing programs) and/or hardware components (e.g., processors that may host the programs and/or special purposes hardware devices that may perform all or a portion of the functionality of the programs).

To estimate the power likely to be consumed by a system under consideration for addition to a deployment, information regarding power consumption of devices and systems may be obtained. For example, storage device power consumption 240, storage system power consumption 242, and other power consumption 244 may be obtained similarly to as described with respect to FIG. 2B. Other power consumption 244 may reflect power consumption estimates for other types (e.g., non-storage) of hardware devices and systems.

The power consumption estimates may be used during system power consumption analysis 246 to estimate the likely power consumption rate for a data processing system configuration. To obtain system power consumption 248, the power consumption estimates for components or systems of a given configuration may be summed (and/or subjected to other processing, such as addition of factors of safety, taking into account inefficiencies in power distribution within a data processing system using correction factors or other mechanisms, etc.).

System power consumption 248 may be an estimate for the power that will be consumed by a data processing system having a particular configuration. The estimate may be used by decision makers to decide whether to add a data processing system to a deployment. To make the determination, a graphical user interface may be used.

Turning to FIG. 2D, a diagram of graphical user interface 270 in accordance with an embodiment is shown. Graphical user interface 270 may be used by a person to ascertain the likely power consumption of a system, and components thereof.

To do so, graphical user interface 270 may include any number of input fields 280-284 usable to define a configuration for a data processing system. The input fields may be implemented using, for example, drop down lists that are pre-populated with configuration operation and/or other type of user interface elements through which a user may provide information regarding the configuration of a data processing system.

The information provided by the user may include, for example, numbers and types of storage components (e.g., storage devices, storage controllers, etc.), a communication architecture that links the storage devices, and/or other information regarding the configuration of a storage device. The information may be used to populate storage system configuration 220 described with respect to FIG. 2B.

Once a configuration is defined, the flows described with respect to FIGS. 2B-2C may be performed to obtain power consumption estimates for components and systems of the data processing system. Information regarding the power consumption estimates may be provided to the user via display fields 290-294. Display fields 290-294 may by dynamic elements that may be updated as the content of input fields is modified, and may reflect the power consumption of the data processing system. For example, the power consumption estimates for storage devices, storage systems, and the data processing system itself may be shown in display fields 290-294. Consequently, a decision maker may be informed regarding likely levels of power consumption by a data processing system under consideration for addition to a deployment.

The information obtained via the data flows described with respect to FIGS. 2B-2C may be used for other purposes. For example, reports or other data structures may be populated with the information described with respect to the data flows. The reports may be circulated to decision makers, may be ingested by other processes (e.g., simulation components), and/or may be used for other purposes.

In this manner, any number of decision makers may be presented with the power consumption estimates for a given data processing system under consideration for addition to a deployment.

If selected for addition to the deployment, a decision maker may use graphical user interface 270 or other graphical user interfaces (e.g., part of the portal described with respect to FIG. 1) to facilitate transportation of an instance of the data processing system to the deployment where it may be onboarded and used.

As discussed above, the components of FIG. 1 may perform various methods to facilitate selection and deployment of data processing systems to deployment. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing data processing system deployment in accordance with an embodiment is shown. The method may be performed by any of deployment 100, device management system 110, management service 120, and/or other components of the system shown in FIG. 1.

At operation 300, a hardware configuration for a data processing system model is obtained. The data processing system model may be under consideration for addition to a deployment. The hardware configuration may be obtained by (i) reading it from memory or storage, (ii) obtaining it from another device, and/or (iii) by generating it. The hardware configuration may be generated using a graphical user interface through which user input may be received. The user input may convey information regarding a data processing system under consideration for addition to the deployment. Part of the hardware configuration may be a storage system configuration, as described with respect to FIG. 2B.

At operation 302, a saturation analysis for a storage system of the data processing system model is performed based on the hardware configuration. The saturation analysis may identify an operation limit for the storage system. The saturation analysis may be performed similarly to the data flow described with respect to FIG. 2B. The identified operation limit may be a reduction in the maximum rate at which a storage device of the storage system may store data due to a limit on the rate at which data may be supplied to the storage device.

At operation 304, a power consumption analysis for the storage system is performed based on the operation limit. A power consumption estimate for the storage system may be obtained by performance of the power consumption analysis. The power consumption analysis may be performed similarly to the data flow described with respect to FIG. 2B.

In an embodiment, the saturation analysis and power consumption analysis are performed using a formula that defines power consumption in terms of the number of storage devices of a storage system. For example, the formula may define the power consumption for the storage device to be that ascribed by the manufacturer while the number of the storage devices is below a threshold level (e.g., below bandwidth limits of upstream components such as storage controllers which may have a finite amount of bandwidth divided by the number of storage device served by the storage controller). For numbers of storage devices above the threshold, the formula may define that the power consumption for the storage device reduces progressively from that ascribed by the manufacturer as the number of storage devices increases above the threshold. The rate of reduction may be empirically determined, and a curve (e.g., polynomial) may be fit to the empirical data.

At operation 306, the power consumption estimate is used to determine whether to add an instance of the data processing system model to the deployment. The power consumption estimate may be used by populating a graphical user interface as described with respect to FIG. 2D, by providing reports regarding the power consumption to decision makers, etc. The decision makers may then provide feedback (e.g., user feedback) indicating whether to add the data processing system to the deployment.

If the data processing system model is selected for deployment, then one from a stock of the data processing system model may be shipped to the deployment. If the data processing system model is not selected for the deployment, then the method shown in FIG. 3 may be repeated by for other hardware configurations which may better meet goals of the operator of the deployment.

The method may end following operation 306.

Using the method illustrated in FIG. 3, embodiments disclosed herein may improve the ability of power consumption to be taken into account for deployment management purposes. By doing so, embodiments disclosed herein may improve the likelihood of deployments having appropriate levels of power provisioned for data processing systems.

Figure 4:
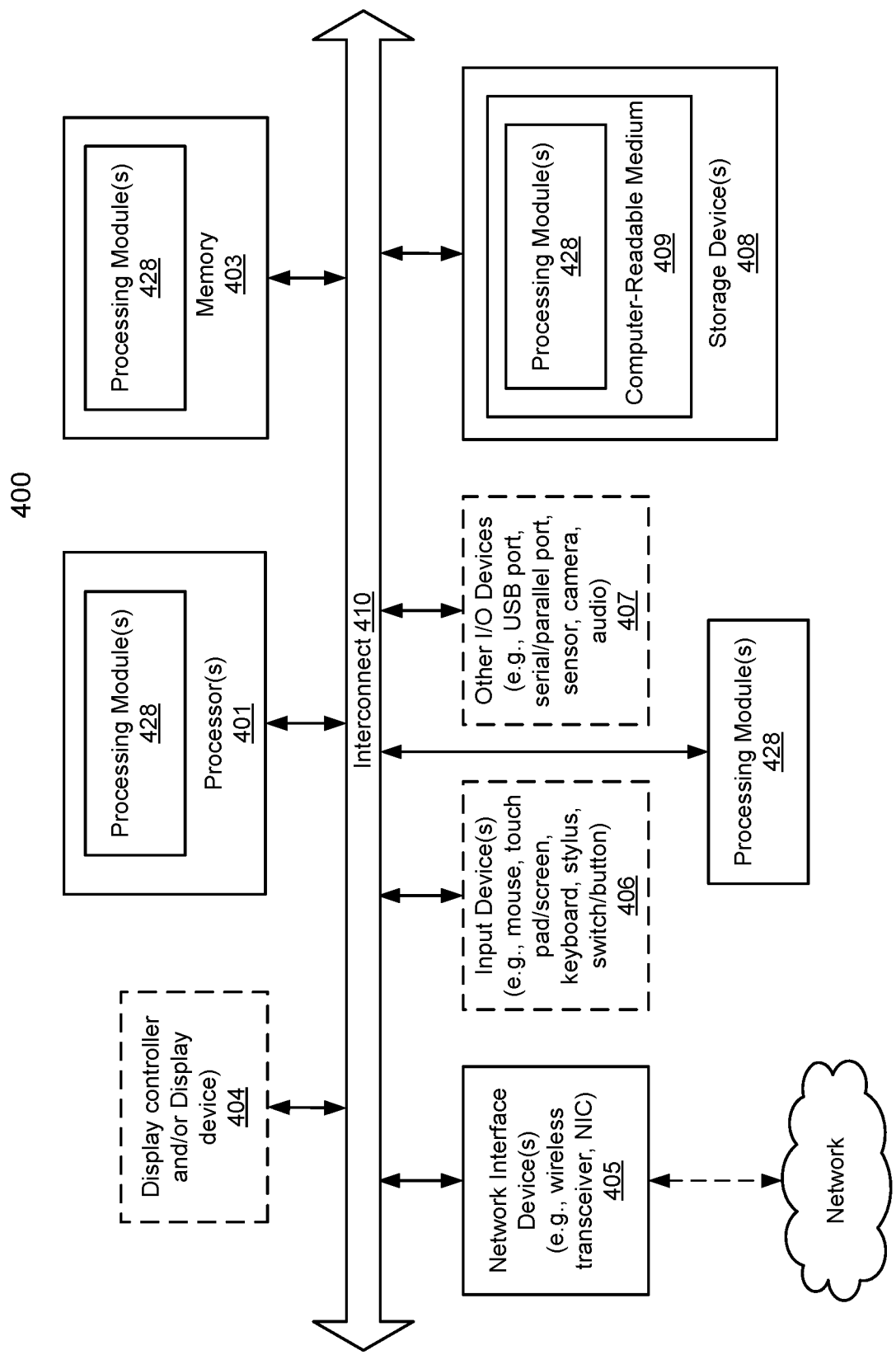
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing power consumption by a deployment, the method comprising, by a data processing system embodied by a computing device:
   obtaining a hardware configuration for a data processing system model under consideration for addition to the deployment;
   determining, using the hardware configuration, an operation limit for each of one or more storage devices of a storage system of the data processing system model, the hardware configuration indicating one or more communication links and hardware components of the data processing system model that affect a data storing rate of each of the one or more storage devices during a normal operating state of the storage system, and the operation limit of each of the storage devices being the data storing rate of each of the storage devices;
   performing a power consumption analysis for the storage system based on the operation limit to obtain a power consumption estimate for the storage system by:
   retrieving, from a power consumption data repository and for each of the storage devices, a power consumption rate at the data storing rate, the power consumption estimate being an aggregate of the power consumption rate of each of the storage devices;
   using the power consumption estimate to determine whether to add an instance of the data processing system model to the deployment; and
   in a first instance of the using where it is determined that the instance of the data processing system model is to be added to the deployment, deploying the instance of the data processing system model to the deployment.

2. The method of claim 1, wherein using the power consumption estimate comprises:
   populating a graphical user interface based on the power consumption estimate;
   obtaining, via the graphical user interface, user input based on the populated graphical user interface, the user input indicating acceptance or rejection of the data processing system model for addition to the deployment.

3. The method of claim 2, wherein using the power consumption estimate further comprises:
   identifying, using the graphical user interface, a second hardware configuration for the data processing system model.

4. The method of claim 1, wherein the data storing rate of each of the storage devices is lower than a maximum data storing rate defined by a manufacturer of each of the storage devices, and the data storing rate being lower than the maximum data storing rate causes a reduced power draw by each of the storage devices, the reduced power draw being lower than a nominal maximum power draw associated with the maximum data storing rate of each of the storage devices, and the nominal maximum power draw being defined by the manufacturer of each of the storage devices.

5. The method of claim 4, wherein the data storing rate of each of the storage devices is based on at least a bandwidth limit of a storage controller of the storage system that transfers data to each of the storage devices.

6. The method of claim 5, wherein the power consumption estimate comprises a sub-estimate for a maximum amount of power drawn by the storage system when the storage devices are saturated and a sub-estimate for a maximum amount of power drawn by a storage device of the storage system when the storage devices are saturated, wherein each of the storage devices is saturated when each of the storage devices is limited to storing data at a data storing rate lower than the maximum data storing rate.

7. The method of claim 1, wherein determining an operation limit and performing the power consumption analysis comprises:
   identifying a number of the storage devices of the storage system; and
   in an instance of the number of storage devices exceeding a threshold, using a formula that defines the power consumption rate for each of the storage devices that scales inversely to the number of the storage devices of the storage system.

8. A non-transitory machine-readable medium having instructions stored therein, which when executed by a processor of a data processing system embodied by a computing device, cause the processor to perform operations for managing power consumption by a deployment, the operations comprising:
   obtaining a hardware configuration for a data processing system model under consideration for addition to the deployment;
   determining, using the hardware configuration, an operation limit for each of one or more storage devices of a storage system of the data processing system model, the hardware configuration indicating one or more communication links and hardware components of the data processing system that affect a data storing rate of each of the one or more storage devices during a normal operating state of the storage system, and the operation limit of each of the storage devices being the data storing rate of each of the storage devices;
   performing a power consumption analysis for the storage system based on the operation limit to obtain a power consumption estimate for the storage system by:
   retrieving, from a power consumption data repository and for each of the storage devices, a power consumption rate at the data storing rate, the power consumption estimate being an aggregate of the power consumption rate of each of the storage devices;
   using the power consumption estimate to determine whether to add an instance of the data processing system model to the deployment; and
   in a first instance of the using where it is determined that the instance of the data processing system model is to be added to the deployment, deploying the instance of the data processing system model to the deployment.

9. The non-transitory machine-readable medium of claim 8, wherein using the power consumption estimate comprises:
   populating a graphical user interface based on the power consumption estimate;
   obtaining, via the graphical user interface, user input based on the populated graphical user interface, the user input indicating acceptance or rejection of the data processing system model for addition to the deployment.

10. The non-transitory machine-readable medium of claim 9, wherein using the power consumption estimate further comprises:
    identifying, using the graphical user interface, a second hardware configuration for the data processing system model.

11. The non-transitory machine-readable medium of claim 8, wherein the operation limit is a limit on a rate of use of storage devices of the storage system, the limit on the rate of use of the storage devices reducing a maximum power draw for the storage devices from a nominal maximum power draw for the storage devices.

12. The non-transitory machine-readable medium of claim 11, wherein the limit on the rate of use of the storage devices of the storage system is based on a bandwidth limit of a storage controller of the storage system.

13. The non-transitory machine-readable medium of claim 12, wherein the power consumption estimate comprises a sub-estimate for a maximum amount of power drawn by the storage system when the storage devices are saturated and a sub-estimate for a maximum amount of power drawn by a storage device of the storage system when the storage devices are saturated.

14. The non-transitory machine-readable medium of claim 8, wherein
determining the operational limit and performing the power consumption analysis comprises:
identifying a number of the storage devices of the storage system; and
in an instance of the number of storage devices exceeding a threshold, using a formula that defines the power consumption rate for each of the storage devices that scales inversely to the number of the storage devices of the storage system.

15. A data processing system, comprising:
a processor; and
a memory coupled to the processor to store instructions, which when executed by the processor, cause the processor to perform operations for managing power consumption by a deployment, the operations comprising:
obtaining a hardware configuration for a data processing system model under consideration for addition to the deployment;
determining, using the hardware configuration, an operation limit for each of one or more storage devices of a storage system of the data processing system model, the hardware configuration indicating one or more communication links and hardware components of the data processing system that affect a data storing rate of each of the one or more storage devices during a normal operating state of the storage system, and the operation limit of each of the storage devices being the data storing rate of each of the storage devices;
performing a power consumption analysis for the storage system based on the operation limit to obtain a power consumption estimate for the storage system by: retrieving, from a power consumption data repository and for each of the storage devices, a power consumption rate at the data storing rate, the power consumption estimate being an aggregate of the power consumption rate of each of the storage devices; and
using the power consumption estimate to determine whether to add an instance of the data processing system model to the deployment; and
in a first instance where the instance of the data processing system model is determined, based on the power consumption estimate, to be added to the deployment: causing deployment of the instance of the data processing system model to the deployment.

16. The data processing system of claim 15, wherein using the power consumption estimate comprises:
populating a graphical user interface based on the power consumption estimate;
obtaining, via the graphical user interface, user input based on the populated graphical user interface, the user input indicating acceptance or rejection of the data processing system model for addition to the deployment.

17. The data processing system of claim 16, wherein using the power consumption estimate further comprises:
identifying, using the graphical user interface, a second hardware configuration for the data processing system model.

18. The data processing system of claim 15, wherein the data storing rate of each of the storage devices is lower than a maximum data storing rate defined by a manufacturer of each of the storage devices, and the data storing rate being lower than the maximum data storing rate causes a reduced power draw by each of the storage devices, the reduced power draw being lower than a nominal maximum power draw associated with the maximum data storing rate of each of the storage devices, and the nominal maximum power draw being defined by the manufacturer of each of the storage devices.

19. The data processing system of claim 18, wherein the data storing rate of each of the storage devices is based on at least a bandwidth limit of a storage controller of the storage system that transfers data to each of the storage devices.

20. The data processing system of claim 19, wherein the power consumption estimate comprises a sub-estimate for a maximum amount of power drawn by the storage system when the storage devices are saturated and a sub-estimate for a maximum amount of power drawn by a storage device of the storage system when the storage devices are saturated, wherein each of the storage devices is saturated when each of the storage devices is limited to storing data at a data storing rate lower than the maximum data storing rate.

* * * * *